US012608594B2

(12) United States Patent
Tay et al.

(10) Patent No.: US 12,608,594 B2
(45) Date of Patent: Apr. 21, 2026

(54) MACHINE-LEARNED ATTENTION MODELS FEATURING OMNIDIRECTIONAL PROCESSING

(71) Applicant: Google LLC, Mountain View, CA (US)

(72) Inventors: Yi Tay, Singapore (SG); Da-Cheng Juan, Sunnyvale, CA (US); Dara Bahri, Lafayette, CA (US); Donald Arthur Metzler, Jr., Sunnyvale, CA (US); Jai Prakash Gupta, Fremont, CA (US); Mostafa Dehghani, Amsterdam (NL); Phillip Pham, Seattle, WA (US); Vamsi Krishna Aribandi, San Francisco, CA (US); Zhen Qin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1114 days.

(21) Appl. No.: 17/592,796

(22) Filed: Feb. 4, 2022

(65) Prior Publication Data

US 2022/0245428 A1     Aug. 4, 2022

Related U.S. Application Data

(60) Provisional application No. 63/145,920, filed on Feb. 4, 2021.

(51) Int. Cl.
*G06N 3/045*        (2023.01)
*G06N 3/10*        (2006.01)
(52) U.S. Cl.
CPC ............... *G06N 3/045* (2023.01); *G06N 3/10* (2013.01)

(58) Field of Classification Search
CPC ................................. G06N 3/045; G06N 3/10
See application file for complete search history.

(56)               References Cited

U.S. PATENT DOCUMENTS

2021/0201044 A1*   7/2021   Herdade ................. G06T 11/20
2023/0359865 A1    11/2023  Shen et al.

FOREIGN PATENT DOCUMENTS

CN          111737573        10/2020

OTHER PUBLICATIONS

Choromanski et al., Rethinking Attention with Performers, Sep. 2020. (Year: 2020).*
Wang et al., Linformer: Self-Attention with Linear Complexity, Jun. 2020. (Year: 2020).*
Zaheer et al., Big Bird: Transformers for Longer Sequences, Jan. 2021. (Year: 2021).*
Dosovitskiy et al., An Image is Worth 16×16 Words: Transformers for Image Recognition at Scale, Oct. 2020. (Year: 2020).*

(Continued)

*Primary Examiner* — Marshall L Werner
(74) *Attorney, Agent, or Firm* — DORITY & MANNING P.A.

(57)                ABSTRACT

Provided are machine-learned attention models that feature omnidirectional processing, example implementations of which can be referred to as Omnidirectional Representations from Transformers (OMNINET). In example models described in the present disclosure, instead of maintaining a strictly horizontal receptive field, each token is allowed to attend to all tokens in some or all of the other tokens across the entire network.

19 Claims, 4 Drawing Sheets

(56) References Cited

OTHER PUBLICATIONS

He et al., Layer-Wise Coordination between Encoder and Decoder for Neural Machine Translation, 32nd Conference on Neural Information Processing Systems, 2018. (Year: 2018).*

Bapna et al., Training Deeper Neural Machine Translation Models with Transparent Attention, Sep. 2018. (Year: 2018).*

Chinese Search Report Corresponding to Application No. 2022101158924 on Dec. 24, 2024.

Abnar et al., "Quantifying Attention Flow in Transformers", arXiv:2005.00928v2, dated May 31, 2020, 8 pages.

Baevski et al., "Adaptive Input Representations for Neural Language Modeling", arXiv:1809.10853v3, dated Feb. 22, 2019, 13 pages.

Bahdanau et al., "Neural Machine Translation by Jointly Learning to Align and Translate", arXiv:1409.0473v7, dated May 19, 2016, 15 pages.

Bapna et al., "Training Deeper Neural Machine Translation Models with Transparent Attention", arXiv:1808.07561v2, dated Sep. 4, 2018, 6 pages.

Brown et al., "Language Models are Few-Shot Learners", 34th Conference on Neural Information Processing Systems (NeurIPS 2020), Vancouver, Canada, pp. 1877-1901.

Carion et al., "End-to-End Object Detection with Transformers", Computer Vision—ECCV 2020, Nov. 3, 2020, vol. 12346, pp. 213-229.

Chelba et al., "One Billion Word Benchmark for Measuring Progress in Statistics Language Modeling", arXiv:1312.3005v3, dated Mar. 4, 2014, 6 pages.

Chen et al., "Generative Pretraining from Pixels", 37th International Conference on Machine Learning, PMLR 119, 2020, pp. 1691-1703.

Choromanski et al., "Rethinking Attention with Performers", arXiv:2009.14794v3, dated Mar. 9, 2021, 38 pages.

Dai et al., "Transformer-XL: Attentive Language Models Beyond a Fixed-Length Context", arXiv:1901.02860v3, dated Jun. 2, 2019, 20 pages.

Dehghani et al., "Universal Transformers", arXiv:1807.03819v3, dated Mar. 5, 2019, 23 pages.

Devlin et al., "BERT: Pre-training of Deep Bidirectional Transformers for Language Understanding", arXiv:1810.04805v1, dated Oct. 11, 2018, 14 pages.

Dosovitskiy et al., "An Image is Worth 16×16 Words: Transformers for Image Recognition at Scale", arXiv:2010.11929v2, Jun. 3, 2020, 22 pages.

Github, "Composable transformers of Python+NumPy programs: differentiate, vectorize, JIT to GPU/TPU, and more", 2018, https://github.com/google/jax, retrieved on Jul. 20, 2022, 13 pages.

Github, "Flax is a neural network library for JAX that is designed for flexibility", 2020, https://github.com/google/flax, retrieved on Jul. 20, 2022, 6 pages.

He et al., "Deep Residual Learning for Image Recognition", Proceedings of the IEEE conference on computer vision and pattern recognition, 2016, pp. 770-778.

He et al., "Layer-Wise Coordination between Encoder and Decoder for Neural Machine Translation", Advances in Neural Information Processing Systems 31 (2018), 11 pages.

He et al., "RealFormer: Transformer Likes Residual Attention", arXiv:2012.11747v3, dated Sep. 10, 2021, 15 pages.

Huang et al., "Densely Connected Convolutional Networks", IEEE Conference on Computer Vision and Pattern Recognition (CVPR), 2017, pp. 4700-4708.

Kolesnikov et al., "Big Transfer (BiT): General Visual Representation Learning", arXiv:1912.11370v3, dated May 5, 2020, 28 pages.

Krizhevsky, "Learning Multiple Layers of Features from Tiny Images", Master's thesis, University of Toronto, Apr. 8, 2009, 60 pages.

Kudo et al., "SentencePiece: A simple and language independent subword tokenizer and detokenizer for Neural Text Processing", arXiv:1808.06226v1, dated Aug. 19, 2018, 6 pages.

Kumar et al., "Colorization Transformer", arXiv:2102.04432v2, dated Mar. 7, 2021, 24 pages.

Langley, "Crafting Papers on Machine Learning", 17th International Conference on Machine Learning (ICML 2000), Stanford, California, pp. 1207-1216.

Liu et al., "Very Deep Transformers for Neural Machine Translation", arXiv:2008.07772v2, dated Oct. 14, 2020, 7 pages.

Nilsback et al., "Automated flower classification over a large number of classes", 2008 Sixth Indian Conference on Computer Vision, Graphics & Image Processing, Dec. 16-19, 2008, Bhubaneswar, India, pp. 722-729.

Ott et al., "Scaling Neural Machine Translation", Proceedings of the Third Conference on Machine Translation: Research Papers, vol. 1, Oct. 31-Nov. 1, 2018, Belgium, Brussels, 9 pages.

Parikh et al., "A Decomposable Attention Model for Natural Language Inference", arXiv:1606.01933v2, dated Sep. 25, 2016, 7 pages.

Parkhi et al., "Cats and Dogs", 2012 IEEE Conference on Computer Vision and Pattern Recognition, Jun. 16-21, 2012, Providence, Rhode Island, pp. 3498-3505.

Post, "A Call for Clarity in Reporting BLEU Scores", arXiv:1804.09771v2, dated Sep. 12, 2018, 6 pages.

Raffel et al., "Exploring the Limits of Transfer Learning with a Unified Text-to-Text Transformer", arXiv:1910.10683v1, dated Oct. 23, 2019, 52 pages.

So et al., "The Evolved Transformer", arXiv:1901.11117v4, dated May 17, 2019, 14 pages.

Srivastava et al., "Highway Networks", arXiv:1505.00387v2, dated Nov. 3, 2015, 6 pages.

Sun et al., "Revisiting Unreasonable Effectiveness of Data in Deep Learning Era", arXiv:1707.02968v2, dated Aug. 4, 2017, 13 pages.

Tay et al., "Densely Connected Attention Propagation for Reading Comprehension", Advances in Neural Information Processing Systems 31 (NeurIPS 2018), Montreal, Canada, 2018, 12 pages.

Tay et al., "Efficient Transformers: A Survey", arXiv:2009.06732v3, dated Mar. 14, 2022, 39 pages.

Tay et al., "Long Range Arena: A Benchmark for Efficient Transformers", arXiv:2011.04006v1, dated Nov. 8, 2020, 16 pages.

Tay et al., "OmniNet: Omnidirectional Representations from Transformers", arXiv:2103.01075v1, dated Mar. 1, 2021, 16 pages.

Vaswani et al., "Attention Is All You Need", Advances in neural information processing systems 30, Long Beach, California, 2017, 11 pages.

Wang et al., "Linformer: Self-Attention with Linear Complexity", arXiv:2006.04768v3, dated Jun. 14, 2020, 12 pages.

Zaheer et al., "Big Bird: Transformers for Longer Sequences", Advances in Neural Information Processing Systems 33 (2020), Vancouver, Canada, 2020, pp. 17283-17297.

* cited by examiner

MACHINE-LEARNED ATTENTION MODELS FEATURING OMNIDIRECTIONAL PROCESSING

RELATED APPLICATIONS

This application claims priority to and the benefit of U.S. Provisional Patent Application Number 63/145,920, which is hereby incorporated by reference in its entirety.

FIELD

The present disclosure relates generally to machine learning. More particularly, the present disclosure relates to machine-learned attention models that feature omnidirectional processing.

BACKGROUND

Various forms of machine learning models make use of attention mechanisms. Attention is a technique that mimics cognitive attention and can enhance the important parts of the input data while reducing the influence of portions of the data that are less relevant to the task at hand. As such, attention mechanisms can enable a computing system to devote more computing power to the small but important part of the data. Which part of the data is more important than others depends on the context and can in some instances be learned through training data by gradient descent.

Attention mechanisms are used in a wide variety of machine learning models, including in natural language processing and computer vision. As one example, Transformer models (Vaswani et al., Attention is all you need. In *Advances in neural information processing systems*, pp. 5998-6008, 2017) make extensive use of attention mechanisms to achieve their expressive power. Computer vision systems based on convolutional neural networks can also benefit from attention mechanisms.

One key defining characteristic of the self-attention mechanism is the global receptive field in which each token is accessible to every other token in the sequence, serving as an enabler for learning global contextual representations.

SUMMARY

Aspects and advantages of embodiments of the present disclosure will be set forth in part in the following description, or can be learned from the description, or can be learned through practice of the embodiments.

One example aspect of the present disclosure is directed to a computing system for omnidirectional attention-based processing. The computing system includes: one or more processors; and one or more non-transitory computer-readable media that collectively store: a machine-learned multi-layer attention model that comprises a plurality of self-attention layers, wherein the multi-layer attention model is configured to process a first input to generate a first output; a machine-learned omnidirectional model configured to: receive a plurality of intermediate layer representations respectively generated at two or more of the plurality of self-attention layers of the machine-learned multi-layer attention model when processing the first input to generate the first output; and process the plurality of intermediate layer representations to generate a second output; and instructions that, when executed by the one or more processors, cause the computing system to perform operations. The operations include: providing the first input to the machine-learned multi-layer attention model to cause generation of the first output; and providing the plurality of intermediate layer representations respectively generated at the two or more of the plurality of self-attention layers of the machine-learned multi-layer attention model as input to the machine-learned omnidirectional model to cause generation of the second output.

Another example aspect of the present disclosure is directed to one or more non-transitory computer-readable media that collectively store: a multi-layer attention model that comprises a plurality of self-attention layers, wherein the multi-layer attention model is configured to process a first input to generate a first output; a omnidirectional model configured to: receive a plurality of intermediate layer representations respectively generated at two or more of the plurality of self-attention layers of the multi-layer attention model when processing the first input to generate the first output; and process the plurality of intermediate layer representations to generate a second output; and instructions that, when executed, cause the computing system to perform operations. The operations include: providing the first input to the multi-layer attention model to cause generation of the first output; providing the plurality of intermediate layer representations respectively generated at the two or more of the plurality of self-attention layers of the multi-layer attention model as input to the machine-learned omnidirectional model to cause generation of the second output; evaluating a loss function to determine a loss value based at least in part on the second output; and training at least the omnidirectional model based at least in part on the loss function.

Other aspects of the present disclosure are directed to various systems, apparatuses, methods, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
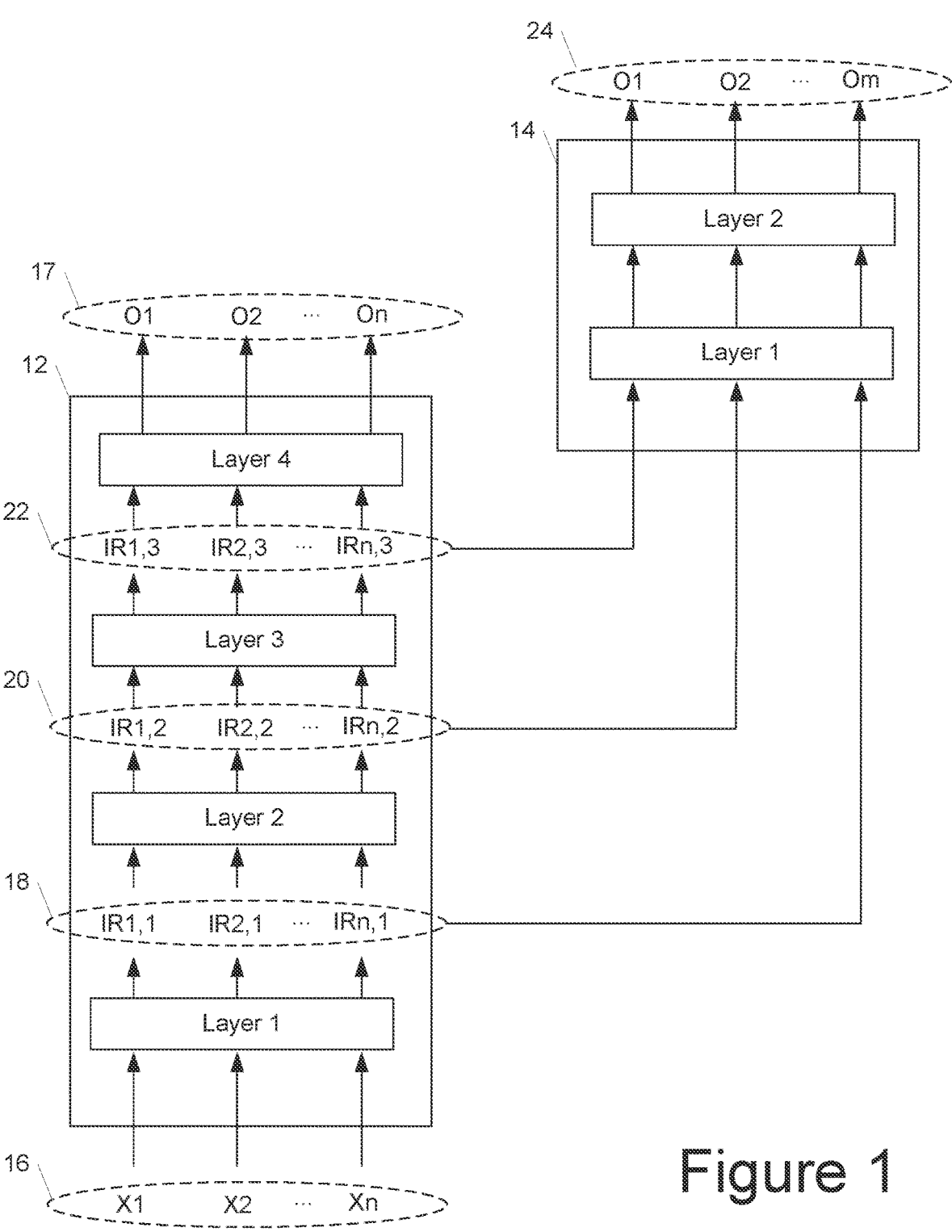
FIG. 1 provides a graphical overview of an example omnidirectional attention model according to example embodiments of the present disclosure.

Reference numerals that are repeated across plural figures are intended to identify the same features in various implementations.

DETAILED DESCRIPTION

Overview

Generally, the present disclosure is directed to machine-learned attention models that feature omnidirectional processing, example implementations of which can be referred to as Omnidirectional Representations from Transformers (OMNINET). In example models described in the present disclosure, instead of maintaining a strictly horizontal receptive field, each token is allowed to attend to all tokens in some or all of the other tokens across the entire network.

In some instance, this process can be interpreted as a form of extreme or intensive attention mechanism that has the receptive field of the entire width and depth of the network. To this end, according to an aspect of the present disclosure, the omnidirectional attention is learned via a meta-learner, which can in some implementations be another self-attention based model. According to another aspect of the present disclosure, in order to mitigate the computationally expensive costs of full receptive field attention, some example implementations of the present disclosure leverage efficient self-attention models such as kernel-based (Choromanski et al., 2020), low-rank attention (Wang et al., 2020) and/or Big Bird (Zaheer et al., 2020) as the meta-learner.

Additionally, extensive experiments were conducted on autoregressive language modeling (LM1B, C4), Machine Translation, Long Range Arena (LRA) and Image Recognition, showing that example implementations of the Omni-Net not only achieve considerable improvements when equipped with both sequence-based (1D) Transformers but also on image recognition (Vision Transformer) tasks. An example implementation of OmniNet also achieves state-of-the-art performance on LM1B, WMT'14 En-De/En-Fr and Long Range Arena.

More particularly, this paper proposes learning omnidirectional representations from or for attention-based models such as transformers. Thus, the systems and methods provided herein move beyond horizontally global receptive fields and explore the possibilities of omnidirectional receptive fields. Stated differently, some example implementations allow each token to not only attend to all other tokens in the same hierarchy, but also some or all other tokens in the network (e.g., including at different levels or layers). This omnidirectional (e.g., global) access enables tokens to not only have a greater (e.g., full) view of the network (e.g., across different levels or layers) but also access the knowledge and intermediate representation of every token at each stage. By modeling the relationships amongst tokens of different hierarchical levels, example models described herein are also able to capture patterns pertaining to the propagation of representations across time. Finally, this can be also interpreted as a form of dense residual connection, which has shown to be beneficial by aiding gradient flow.

Intuitively, learning omnidirectional receptive fields is non-trivial for two key reasons. Firstly, given the quadratic complexity of the scaled dot product attention, the complexity of designing such a receptive field is increased from $N^2L$ to $(NL)^2$ where L is the depth of the network and N is the sequence length. This challenge has prohibited this type of architecture to be explored in the past. Secondly, simply enabling omnidirectional attention from the get-go would easily cause a degeneration of the base model into a flat network, losing much of its representation power that is enabled by sequentially refining its representations over the network hierarchy.

To mitigate the above issues, some example omnidirectional attention models proposed herein can be implemented as a form of meta-learner that acts upon a standard transformer model. As one example, the meta-learner can itself be a self-attention model that accepts all hidden representations across some or all layers of the base model as an input and refines them based on all the available information. In order to mitigate the prohibitive memory and computational costs of omnidirectional attention, some example implementations leverage one or more of efficient alternatives of parameterizing the meta-learner, e.g., including fast attention via generalizable kernel attention (Choromanski et al., 2020), low-rank self-attention (Wang et al., 2020), and/or block-based sparsity (Zaheer et al., 2020). Additionally, employing methods that try to learn the low-rank factorized structure of the entire network can lead to improve generalization capabilities.

Aside from varying the parameterization of the meta-learner, some example implementations of the present disclosure can also include partitioned variants of OmniNet in which the meta-learner is applied to subsets of the layers such as, for example, every consecutive p layers. For example, this partitioning strategy groups the full network of L layers into L/p partitions. After computing each partition, the meta-learner can learn the omnidirectional attention of some or all nodes across some or all layers in the partition.

Additionally, extensive experiments empirically demonstrate that OmniNet achieves very promising results on a myriad of language, vision and synthetic tasks. Specifically, strong experimental results were obtained on autoregressive language modeling, five collections of WMT machine translation, Long Range Arena (Tay et al., 2020) and Image Recognition (both few-shot learning and fine-tuning fashion) using Vision Transformers (Dosovitskiy et al., 2020). On machine translation, OmniNet outperforms ADMIN (Liu et al., 2020), the current state-of-the-art 60 layer deep transformer model on two well-established machine translation collections (WMT' 14 English-German and WMT' 14 English-French). On the one billion language modeling benchmark, OmniNet outperforms existing state-of-the-art models such as Transformer-XL. On LRA, OmniNet improves Performers by +8:9% and vanilla Transformers by +2:6%.

The systems and methods of the present disclosure provide a number of technical effects and benefits. As one example, the omnidirectional-attention mechanisms described herein can result in improved performance (e.g., greater accuracy) of machine-learned models at various tasks, including, for example, image processing or analysis tasks and/or natural language processing or analysis tasks. Thus, the proposed omnidirectional-attention mechanisms can enable an improvement in the performance of a computing system.

As another example technical effect, the omnidirectional-attention mechanisms described herein can enable machine-learned models to maintain a same level of performance while reducing the number of parameters included in the model. Reducing the number of parameters can result in improved conservation of computing resources such as processor usage, memory usage, network bandwidth, etc. For example, a model with the omnidirectional-attention mechanisms described herein may achieve the same performance as a larger model that does not have the omnidirectional-attention mechanisms described herein. Therefore, the model with the omnidirectional-attention mechanisms described herein can be stored using less memory consumption.

As another example technical effect, the omnidirectional-attention mechanisms described herein can enable the size (e.g., in number of parameters, layers, etc.) of the machine-learned multi-layer model to be reduced (e.g., relative to a same style of model that has not been trained using the omnidirectional-attention mechanisms described herein). A reduction in size can result in less consumption of memory, faster run time, and/or other computational benefits.

Example Omnidirectional Attention Model

FIG. 1 provides a graphical overview of an example omnidirectional attention model according to example embodiments of the present disclosure. FIG. 1 depicts a machine-learned multi-layer model 12 that contains a plurality of layers. As one example, the machine-learned multi-layer model 12 can be a multi-layer attention model and one or more of a plurality of layers of the model 12 can be attention-based layers such as self-attention layers such as multi-headed self-attention layers. In one example, the machine-learned multi-layer model 12 is a Transformer model. In another example, the machine-learned multi-layer model 12 is a multi-layer neural network. Although four layers are shown, any number of layers can be included in the model 12.

The multi-layer model 12 can be configured to process a first input 16 to generate a first output 17. For example, the first input 16 can be sequential in nature. The first output 17 can be sequential in nature or can be a single output. As examples, the first input 16 can include a natural language input (e.g., tokens for text) and/or an image input.

Furthermore, as a result of processing the first input 16 to generate the first output 17, the machine-learned multi-layer model 12 can generate a plurality of intermediate layer representations (e.g., 18, 20, and 22) at the plurality of layers of the machine-learned multi-layer model 12.

FIG. 1 also depicts a machine-learned omnidirectional model 14 which is configured to receive the intermediate layer representations (e.g., 18, 20, and 22) from two or more of the plurality of layers of the machine-learned multi-layer model 12. The machine-learned omnidirectional model 14 can process the plurality of intermediate layer representations (e.g., 18, 20, and 22) to generate a second output 24. The second output 24 can be sequential in nature or can be a single output.

In some implementations, for example as shown in FIG. 1, the omnidirectional model 14 can receive all of the intermediate layer representations 18, 20, and 22. However, in other examples, only some of representations are provided from model 12 to model 14. In some examples, the intermediate representations of model 12 can be partitioned into one or more batches or partitions and separately provided to the model 14 for separate processing by the model 14.

As one example, the machine-learned omnidirectional model 14 itself can be a multi-layer attention model and one or more of a plurality of layers of the model 14 can be attention-based layers such as self-attention layers such as multi-headed self-attention layers. In one example, the machine-learned omnidirectional model 14 is a Transformer model. In another example, the machine-learned omnidirectional model 14 is a multi-layer neural network. Although two layers are shown, any number of layers can be included in the model 14.

In some implementations, at least one of the one or more self-attention layers of the machine-learned omnidirectional model 14 performs kernel-based attention. In some implementations, at least one of the one or more self-attention layers of the machine-learned omnidirectional model 14 performs low-rank attention in which low-rank projection transformations are shared across a plurality of heads or a plurality of key and value parameters. In some implementations, at least one of the one or more self-attention layers of the machine-learned omnidirectional model 14 performs block and memory-based attention in which attention is performed within a neighborhood.

In some implementations, providing the plurality of intermediate layer representations (e.g., 18, 20, 22) as input to the machine-learned omnidirectional model 14 can include performing an index sorting operation to sort tokens within each intermediate layer representation according to index (e.g., token index). As described above, in some implementations, providing the plurality of intermediate layer representations (e.g., 18, 20, 22) as input to the machine-learned omnidirectional model 14 can include separately obtaining respective intermediate layer representations from a plurality of different partitions of the two or more of the plurality of layers plurality of self-attention layers of the machine-learned multi-layer attention model and separately inputting the respective intermediate layer representations from the plurality of different partitions into the machine-learned omnidirectional model.

In some implementations, a final output can be determined based at least in part on the first output 17 and the second output 24. For example, the first output 17 and the second output 24 can be summed to produce the final output. In some implementations, a pooling function (e.g., a max pool) can be applied to the second output.

In some implementations, a computing system can evaluate a loss function to determine a loss value based at least in part on the first output 17, the second output 24, and/or a final output generated from the first output 17 and/or the second output 24. The computing system can train the multi-layer model 12 and/or the omnidirectional model 24 based at least in part on the loss function. For example, the computing system can jointly train (e.g., via joint back-propagation of a gradient of the loss function) both the multi-layer model 12 and the omnidirectional model 14 based at least in part on the loss function.

In some implementations, at inference time, both models 12 and 14 can be run jointly to produce an inference or prediction (e.g., as a final output). In other implementations, after training jointly with model 14, model 12 can be used at inference time alone (e.g., without model 14). However, due to having been trained jointly with model 14, model 12 can still provide improved inferences or predictions (e.g., relative to a model that has not be so jointly trained).

Example Omnidirectional Models

This section introduces example implementations of OmniNet. This section first begins by reviewing the standard Transformer architecture.

Example Transformer Architectures

This section provides a brief background for the Transformer architecture. The Transformer block accepts N×d input, where N denotes the number of tokens in the sequence and d denotes the size of the representation. Each Transformer block is characterized by a self-attention block and a two layered feed-forward network with ReLU activations in-between that is applied position-wise.

Example Self-Attention

The self-attention mechanism first projects each input X into Q, K, V representations using linear transformations, corresponding to queries, keys, and values. The self-attention mechanism is typically multi-headed where multiple similar linear projections are executed in parallel. The output of each self-attention head h at layer l is written as:

$$y_{h,l} = softmax\left(\frac{Q_{h,l}K_{h,l}^T}{\sqrt{d_k}}\right)V_{h,l}, \tag{1}$$

where $y_{h,l}$ is the output of head h at layer l and $d_k$ is the size of each head. The output from the multiple heads is then concatenated and then passed through another linear transformation via $W_{o,l}$ which projects the concatenation of all heads down to $d_m$. This is wrapped via a layer normalization followed by a residual connection and can be written as:

$$LayerNorm(W_{o,l}concat([y_{1,l} \ldots y_{H,l}]))+x_{l-1}$$

as the final output of the self-attention module. Feed Forward Layers

The FFN block of the Transformer block performs a two layer transformation defined as:

$$z_l=LayerNorm(W_{1,l}ReLU(W_{2,l}(Y)))+z_{l-1}, \tag{2}$$

where $W_1$, $W_2$ are trainable parameters (weight transforms) of the FFN layer. Bias parameters are omitted for clarity.

Example OmniNet

The proposed OmniNet method can operate on an arbitrary multi-layered architecture that accepts sequential inputs. In our description, this typically refers to a stacked X-former architecture in this section. Note that while this is typically a transformer model, it can also be an arbitrary variant.

Example Omnidirectional Representations

In a stacked network of L layers, each layer exposes a sequence of N vectors of d dimensions each. Specifically, OmniNet operates across all layers and connects the multi-layered network architecture in a grid like fashion. We describe the network as xformer which accepts X as an input and returns a tensor of L×N×d dimensions.

$$xformer(X)=X_1,X_2 \ldots X_L, \tag{3}$$

where $X_i \in \mathbb{R}^{N \times d}$. Let $$X_j^i$$

be the representation of X at layer i and position j of the sequence. The OmniNet mechanism can be written as:

$$O=Attend(IndexSort(X_1,X_2, \ldots X_L)), \tag{4}$$

where Attend denotes an arbitrary self-attention block. The IndexSort operation takes $X_1$, $X_2$, $X_L$ and sorts, tokens within each matrix by index such that the adjacent token of the ith token in layer l are the ith token from l−1 and l+1 respectively. Since attention is permutation invariant this sorting simply makes it easier to (1) compute casual masks and (2) aggregate representations index-wise. Next, given that the input sequence length is LN, it is advantageous for Attend to be as efficient as possible. The next sections describe three example variants of OmniNet's core linear-time self-attention mechanism in subsequent sections.

Given $O \in \mathbb{R}^{(L \times N) \times d}$ the output of the omnidirectional attention, the model can perform $P(\cdot)$ a pooling operator. While there are many choices of pooling operators, parameterized or otherwise, some example implementations adopt a simple pooling function—a max pooling of stride L.

$$O'=MaxPool1D(O), \tag{5}$$

where $O' \in \mathbb{R}^{N \times d}$

Given O', the final representation of an OmniNet augmented network is defined as:

$$OmniNet(X)=xformer(X)_L+O'. \tag{6}$$

The OmniNet and main transformer model can in some implementations be trained together in an end-to-end fashion, i.e., gradients flow to both networks concurrently at each backward pass.

Examples for Maintaining Causality and Autoregressive Decoding

A key point to note with IndexSort is that this order enables us to apply a causal mask to the Attend function, namely if tokens are sorted according to sequence index first as opposed to layer first, then it would be easy to apply a causal mask M, where M[i,j]=0 when i≤j and −inf when i>j. This enables OmniNet to be used in autoregressive settings.

Example Efficient Transformers

The following subsections describe several choices of linear-time self-attention mechanisms that can be used in OmniNet's omnidirectional attention. Generally, Attend refers to an attention block with an attention function and a two-layered positional FFN in a similar structure to the transformer backbone.

Kernel-Based:

This variant uses the generalizable kernel attention. Specifically, this is written as:

$$o = W_o concat\left(\hat{D}_d^{-1}\left(\phi(Q_h)(\phi(K_h))^T V_h\right)\right),$$

where $\hat{D}_h=diag\phi(Q_h)((\phi(K_h))^T 1_L)$ and $\phi(\cdot)$ is a random feature map that projects $\mathbb{R}^d$ to $\mathbb{R}^r$.

Low-Rank:

In this example, Attend can be set as follows:

$$o = W_o\left(concat\left(softmax\frac{Q_h(WK_h)^T}{\sqrt{d_k}}\right)(WV_h)\right),$$

where $W \in \mathbb{R}^{N \times k}$ are low-rank projection transformations that are shared across heads and across keys and values. The complexity of this self-attention mechanism is Nk instead of $N^2$, where k≪N.

Block and Memory Based:

Another example includes a block and memory-based variant of efficient Transformers. In short, this is a combination of windowed attention, global attention, and sparse attention. The output for token i is defined as:

$$o_i = x_i + \sum_{h=1}^{H} softmax\left(Q_{h,i}K_{h,N(i)}^T\right)V_{h,i},$$

where N(i) is the neighborhood function which denotes the out-neighbors of node i, H is the total number of heads and h represents a head. The neighborhood function is mainly dependent on the width of the windowed attention.

Example Partitioned OmniNet

This section describes example types of partitioning variants that can be used in OmniNet. When L is large, the eventual representation input to OmniNet can be extremely large. For example, a sequence length of 1K would result in a 11K input sequence length for a 12 layered Transformer model, when using an omnidirectional layer as the final layer.

Let P be an integer valued hyperparameter that determines the partition size. For a L layer transformer network, when $\ell$ modP is 0, we insert a meta-learner block.

$$X_\ell = \begin{cases} \text{Attend}(X_{\ell-P}, \ldots X_{\ell-1})), & \text{if } \ell \bmod P = 0 \\ xformer(X_{\ell-1}) \end{cases}$$

In short, whenever $\ell$ modP=0, an omnidirectional attention layer can be activated, aggregating representations all the way from the previous partition $\ell$ –P layer up till $\ell$ –1. In this case, the original xformer layer can be skipped, hence maintaining approximately the same parameter size of the network.

Example Devices and Systems

Figure 2A:
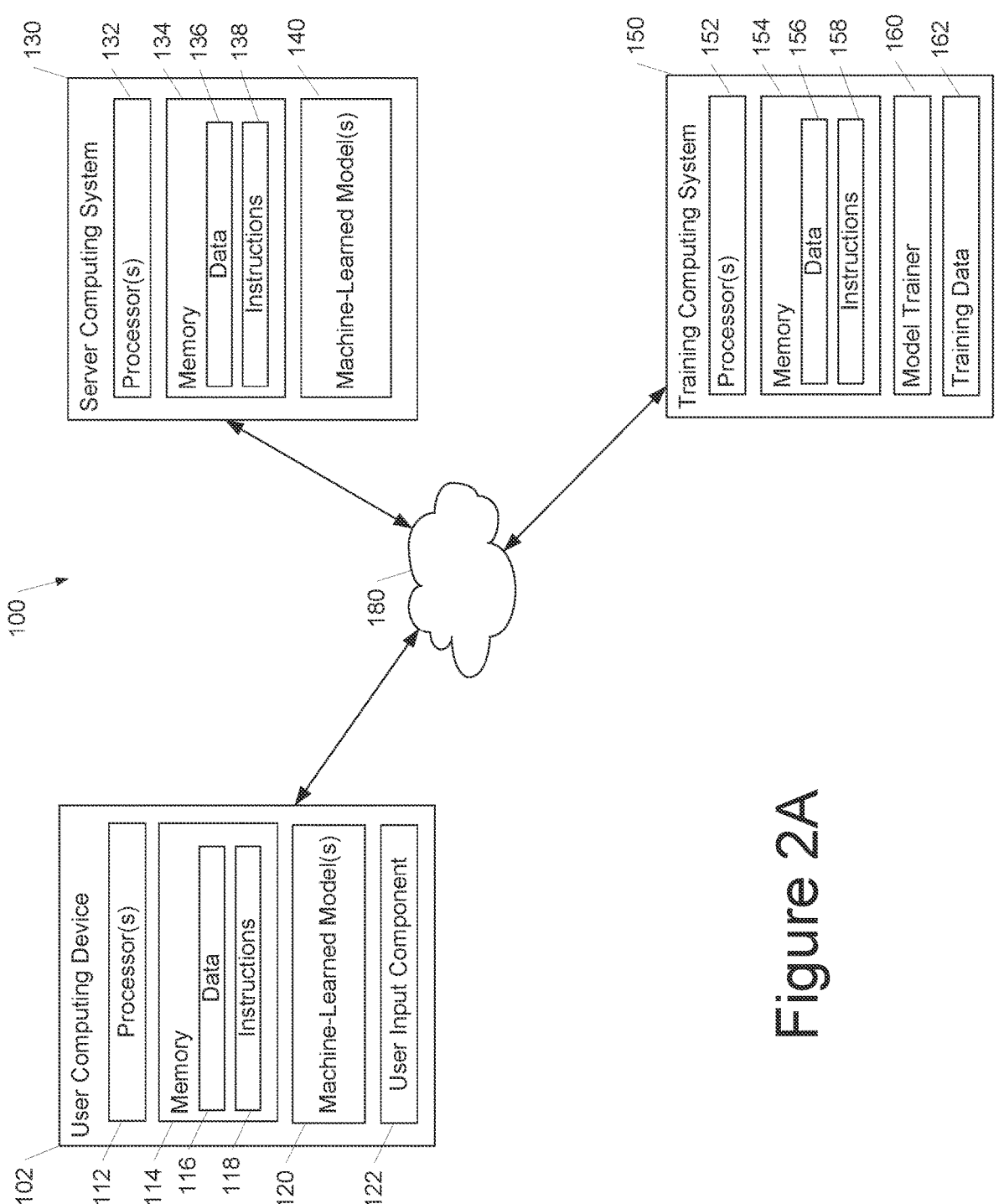
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIG. 1.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected.

The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
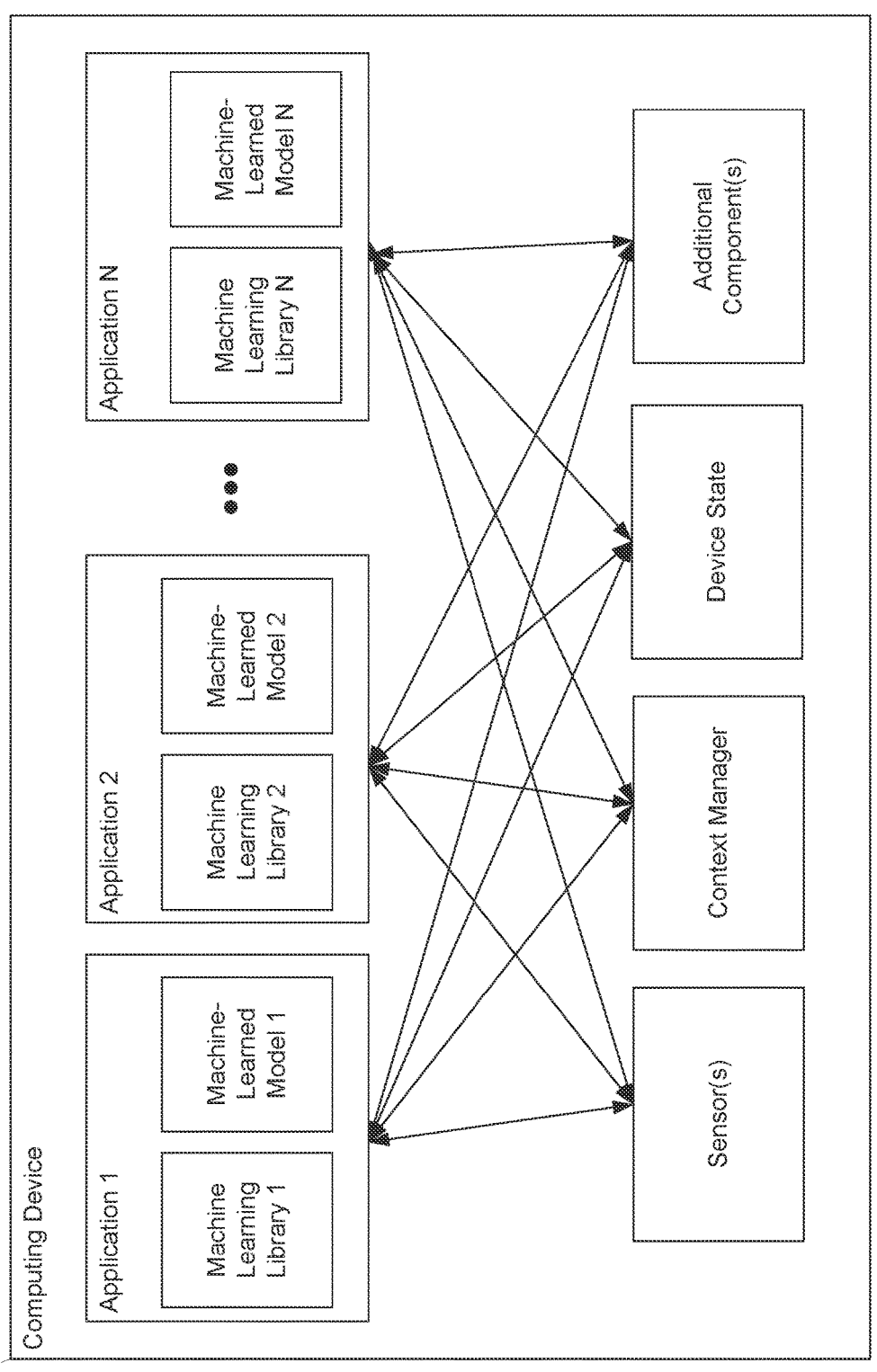
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
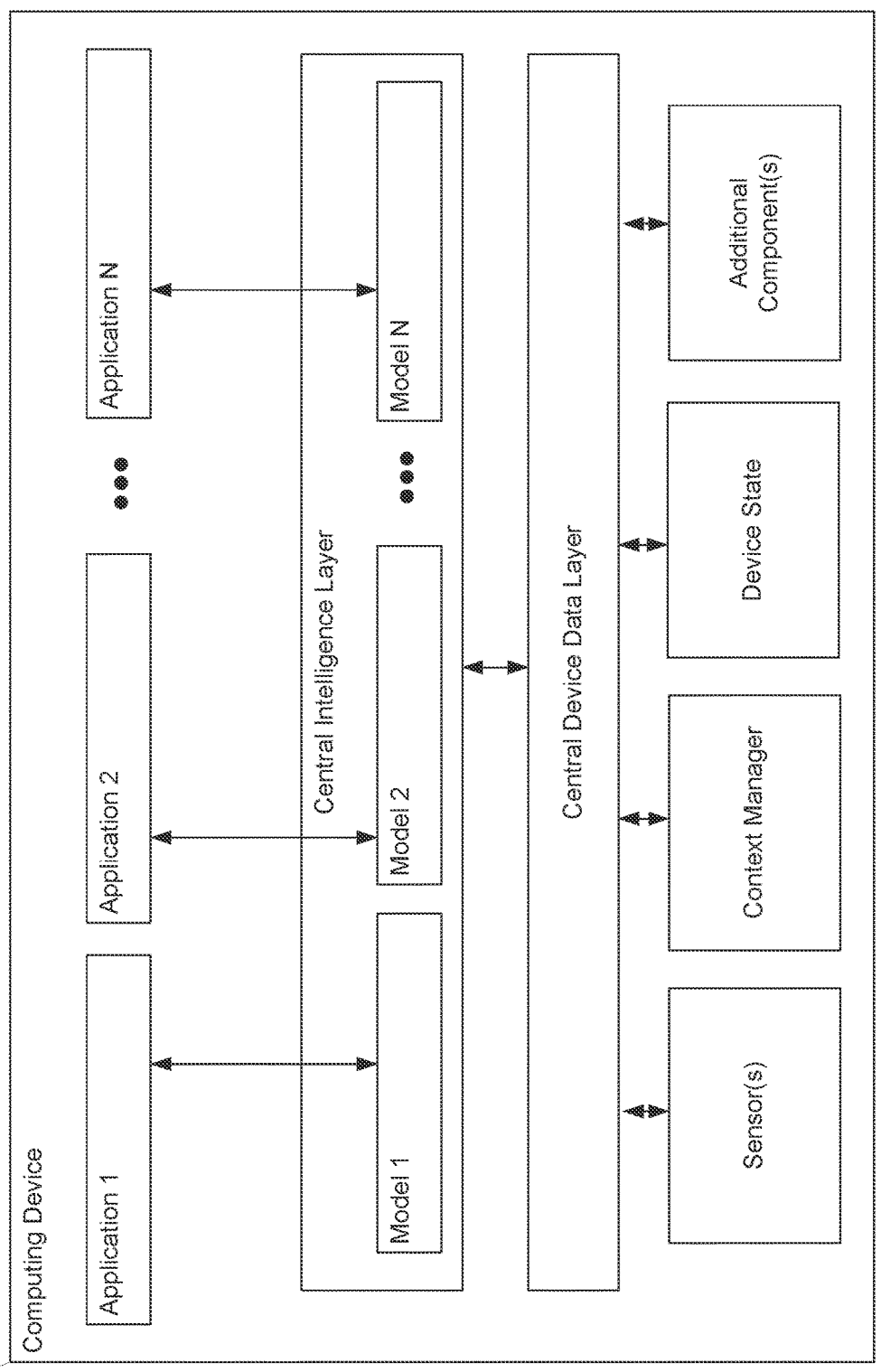
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for omnidirectional attention-based processing, the computing system comprising:
   one or more processors; and
   one or more non-transitory computer-readable media that collectively store:
   a machine-learned multi-layer attention model that comprises a plurality of self-attention layers;
   a machine-learned omnidirectional model configured to:
   receive a plurality of intermediate layer representations respectively generated at two or more of the plurality of self-attention layers of the machine-learned multi-layer attention model;

attend between a first intermediate layer representation from a first layer of the machine-learned multi-layer attention model and a second intermediate layer representation from a second layer of the machine-learned multi-layer attention model; and
   attend between the first intermediate layer representation and a third intermediate layer representation from a third layer of the machine-learned multi-layer attention model; and
   instructions that, when executed by the one or more processors, cause the computing system to perform operations, the operations comprising:
   providing a first input to the machine-learned multi-layer attention model to cause generation of a first output;
   providing the plurality of intermediate layer representations respectively generated at the two or more of the plurality of self-attention layers of the machine-learned multi-layer attention model as input to the machine-learned omnidirectional model to cause generation of a second output.

2. The computing system of claim 1, wherein the machine-learned omnidirectional model comprises one or more self-attention layers.

3. The computing system of claim 2, wherein at least one of the one or more self-attention layers of the machine-learned omnidirectional model performs kernel-based attention.

4. The computing system of claim 2, wherein at least one of the one or more self-attention layers of the machine-learned omnidirectional model performs low-rank attention in which low-rank projection transformations are shared across a plurality of heads or a plurality of key and value parameters.

5. The computing system of claim 2, wherein at least one of the one or more self-attention layers of the machine-learned omnidirectional model performs block and memory-based attention in which attention is performed within a neighborhood.

6. The computing system of claim 1, wherein the input to the machine-learned omnidirectional model comprises respective representations of the plurality of intermediate layer representations sorted according to sequence index.

7. The computing system of claim 1, wherein providing the plurality of intermediate layer representations as input to the machine-learned omnidirectional model comprises:
   separately obtaining respective intermediate layer representations from a plurality of different partitions of the two or more of the plurality of layers plurality of self-attention layers of the machine-learned multi-layer attention model; and
   separately inputting the respective intermediate layer representations from the plurality of different partitions into the machine-learned omnidirectional model.

8. The computing system of claim 1, wherein the machine-learned omnidirectional model comprises a pooling operator that receives the output of an omnidirectional attention mechanism, the omnidirectional attention mechanism attending between the plurality of intermediate layer representations respectively generated at the two or more of the plurality of self-attention layers of the machine-learned multi-layer attention model.

9. The computing system of claim 1, wherein the machine-learned multi-layer attention model comprises a transformer model.

10. The computing system of claim 1, wherein the first input comprises a natural language input or an image input.

11. One or more non-transitory computer-readable media that collectively store:

a multi-layer attention model that comprises a plurality of self-attention layers;

a omnidirectional model configured to:

receive a plurality of intermediate layer representations respectively generated at two or more of the plurality of self-attention layers of the multi-layer attention model when processing the first input to generate the first output;

attend between a first intermediate layer representation from a first layer of the machine-learned multi-layer attention model and a second intermediate layer representation from a second layer of the multi-layer attention model; and attend between the first intermediate layer representation and a third intermediate layer representation from a third layer of the multi-layer attention model; and instructions that, when executed, cause a computing system to perform operations, the operations comprising:

providing a first input to the multi-layer attention model to cause generation of a first output;

providing the plurality of intermediate layer representations respectively generated at the two or more of the plurality of self-attention layers of the multi-layer attention model as input to the machine-learned omnidirectional model to cause generation of a second output; and training at least the omnidirectional model based at least in part on a loss value from a-loss function, the loss value based at least in part on the second output.

12. The one or more non-transitory computer-readable media of claim 11, wherein training at least the omnidirectional model based at least in part on the loss function comprises jointly training both the multi-layer attention model and the omnidirectional model based at least in part on the loss function.

13. The one or more non-transitory computer-readable media of claim 11, wherein the omnidirectional model comprises one or more self-attention layers.

14. The one or more non-transitory computer-readable media of claim 11, wherein the first input comprises an image.

15. A computing system for omnidirectional attention-based processing, the computing system comprising:

one or more processors; and one or more non-transitory computer-readable media that collectively store:

a machine-learned omnidirectional model configured to:

receive a plurality of intermediate layer representations respectively generated by two or more of a plurality of self-attention layers of a machine-learned multi-layer attention model;

attend between a first intermediate layer representation from a first layer of the machine-learned multi-layer attention model and a second intermediate layer representation from a second layer of the multi-layer attention model; and attend between the first intermediate layer representation and a third intermediate layer representation from a third layer of the multi-layer attention model; and instructions that, when executed by the one or more processors, cause the computing system to perform operations, the operations comprising:

providing a first input to the machine-learned multi-layer attention model to cause generation of a first output;

providing the plurality of intermediate layer representations respectively generated at the two or more of the plurality of self-attention layers of the machine-learned multi-layer attention model as input to the machine-learned omnidirectional model to cause generation of a second output.

16. The computing system of claim 15, wherein the machine-learned omnidirectional model comprises one or more self-attention layers.

17. The computing system of claim 16, wherein at least one of the one or more self-attention layers of the machine-learned omnidirectional model performs kernel-based attention.

18. The computing system of claim 16, wherein at least one of the one or more self-attention layers of the machine-learned omnidirectional model performs low-rank attention in which low-rank projection transformations are shared across a plurality of heads or a plurality of key and value parameters.

19. The computing system of claim 16, wherein at least one of the one or more self-attention layers of the machine-learned omnidirectional model performs block and memory-based attention in which attention is performed within a neighborhood.

* * * * *